United States Patent
Dai et al.

(10) Patent No.: US 8,075,182 B2
(45) Date of Patent: Dec. 13, 2011

(54) APPARATUS AND METHOD FOR MEASURING CHARACTERISTIC AND CHIP TEMPERATURE OF LED

(75) Inventors: Ming-Ji Dai, Chiayi County (TW); Chun-Kai Liu, Taipei (TW); Heng-Chieh Chien, Taipei County (TW); Chih-Kuang Yu, Chiayi (TW); Sheng-Liang Li, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 826 days.

(21) Appl. No.: 12/168,921

(22) Filed: Jul. 8, 2008

(65) Prior Publication Data

US 2009/0154525 A1 Jun. 18, 2009

(30) Foreign Application Priority Data

Dec. 14, 2007 (TW) .............................. 96147955 A

(51) Int. Cl.
*G01K 7/00* (2006.01)
(52) U.S. Cl. .............................. 374/178; 374/183; 374/1
(58) Field of Classification Search .................. 374/178, 374/179, 183, 163, 133, 1, 2
See application file for complete search history.

(56) References Cited

U.S. PATENT DOCUMENTS

| | | | |
|---|---|---|---|
| 5,401,099 A | | 3/1995 | Nishizawa et al. |
| 6,827,487 B2 * | | 12/2004 | Baumbach .................... 374/164 |
| 7,052,180 B2 * | | 5/2006 | Shih .............................. 374/178 |
| 7,102,417 B2 * | | 9/2006 | Gordon et al. .................... 374/1 |
| 7,952,368 B1 * | | 5/2011 | Dai et al. ........................ 374/178 |
| 2002/0037026 A1 * | | 3/2002 | Sato et al. ....................... 374/132 |
| 2003/0133491 A1 * | | 7/2003 | Shih .............................. 374/163 |
| 2006/0280224 A1 * | | 12/2006 | Shih .............................. 374/178 |
| 2008/0291970 A1 * | | 11/2008 | Franch et al. .................. 374/178 |
| 2009/0154525 A1 * | | 6/2009 | Dai et al. ........................ 374/178 |
| 2009/0306912 A1 * | | 12/2009 | Chen et al. ..................... 374/178 |
| 2010/0176746 A1 * | | 7/2010 | Catalano et al. ............... 374/163 |
| 2010/0315019 A1 * | | 12/2010 | Hoogzaad et al. ............. 374/183 |
| 2011/0031903 A1 * | | 2/2011 | Nguyen Hoang et al. .... 374/178 |
| 2011/0080933 A1 * | | 4/2011 | Rivero ........................... 374/178 |
| 2011/0150028 A1 * | | 6/2011 | Nguyen Hoang et al. ......... 374/1 |

FOREIGN PATENT DOCUMENTS

| | | |
|---|---|---|
| JP | 10-300811 | 11/1998 |
| TW | 485240 | 5/2002 |
| TW | M283323 | 12/2005 |

\* cited by examiner

*Primary Examiner* — Yaritza Guadalupe-McCall
(74) *Attorney, Agent, or Firm* — Jianq Chyun IP Office

(57) ABSTRACT

An apparatus for measuring a characteristic and a chip temperature of an LED includes a thermal conductive component. An LED chip is disposed on the thermal conductive component. A temperature control unit is connected to the thermal conductive component for providing a temperature to the thermal conductive component, and therefore providing the temperature to the LED chip via the thermal conductive component. A power-source and voltage-meter unit provides a current to the LED chip, and measures a voltage value of the LED chip. Under a measurement mode, the current is featured with a current waveform having a high current level and a low current level which are alternatively changed, for applying to the LED chip. Measurements are conducted respectively corresponding to the high current level and the low current level, and a correlation curve between the voltage and the temperature can be obtained with the results of measurement.

22 Claims, 4 Drawing Sheets

APPARATUS AND METHOD FOR MEASURING CHARACTERISTIC AND CHIP TEMPERATURE OF LED

CROSS-REFERENCE TO RELATED APPLICATION

This application claims the priority benefit of Taiwan application serial no. 96147955, filed Dec. 14, 2007. The entirety of the above-mentioned patent application is hereby incorporated by reference herein and made a part of this specification.

BACKGROUND OF THE INVENTION

1. Field of the Invention

The present invention generally relates to an apparatus and a method for measuring a characteristic and a chip temperature of a light emitting diode (LED).

2. Description of Related Art

Recently, benefited from the drastic development of the epitaxy technology, LED semiconductor technology has successfully improved the light emitting efficiency of LED chips. As such, LEDs are more widely used, for example in projection pens, and illuminations. LEDs are known as having advantages of small sizes, longer lifetime, no contamination, and low cost. In addition, LEDs have better optical characteristics such as good color saturation, and ideal dynamic color control. In these manners, LED and related technologies are specifically concerned for further development.

However, when a high power illumination is demanded, for example, a larger current density has to be inputted. Unfortunately, under the situation that the light emitting efficiencies of the current LED chips is limited, most of the inputted power is converted into heat causing a drastic increase on heating generating density. In such a way, the overheat problem is a bottleneck in technology development. Thermal resistance, is defined as a quantity of a junction temperature of an LED being subtracted the ambient temperature and further divided by a corresponding input power. The thermal resistance is a criterion for evaluating a capability of heat dissipation of an LED package. A larger thermal resistance indicates a worse capability of heat dissipation, while a smaller thermal resistance indicates a better capability of heat dissipation.

When packaging an LED, an upper limit of the thermal resistance should be restricted. As such, the measurement of thermal resistances of components is important and representative. As to the parameters for calculating the thermal resistance, the ambient temperature can be conveniently obtained by measuring with a thermal couple. As to the thermal-generating component, the inputted power is also known and easy to obtain. However, a junction of a packaged LED is encapsulated inside, and therefore the junction temperature of LED chip is difficult to measure with a direct measurement. As such, the junction temperature is usually measured with an indirect electrical measurement. If the method can fast and accurate measuring the thermal conductivity and the effect on optical characteristics due to heat of the component to be tested, it would be helpful in facilitating to the design and testing of the thermal conductivity of LED chips.

Typically, conventional measurement mechanisms for LED chips are similar with those for ordinary IC chips. FIG. 1 is a schematic diagram illustrating a testing circuit for measuring a thermal conductivity of a conventional IC chip. Referring to FIG. 1, it is a real die method. There is no standardized thermal conductivity testing chip can be used for such a high power LED chip 100, and therefore the real die method is then adapted for the high power LED chip 100. The real die method includes two steps for measurement. One step is to measure a temperature sensitive parameter (TSP). In this step, a real current, e.g., 350 mA, is provided to the LED chip 100 by an operation current 102 and a voltage meter 104, and in another hand, a small current, e.g., 1 mA, is also provided to the LED chip 100 by a current source 108 and another voltage meter 110 in a temperature controlled environment for measuring a relationship between a chip temperature and an output voltage. Another step is to switch between the real current, i.e., 350 mA, and the small current, i.e., 1 mA, with a fast switch 106. Generally, a time of inputting the small current, should be less than 0.01% of a time of inputting the real current, for example shorter than 200 ms, or even shorten than 1 ms. Under this circumstance, a forward voltage under 1 mA is measured for the calculation of the chip temperature.

There are also some other conventional technologies for measuring thermal resistance. However, they are usually complicated, which often require the use of a metal-oxide semiconductor field effect transistor (MOSFET), or a rectifier diode, or even an OR logic circuit including at least two rectifier diodes. Otherwise, for an optical measurement, the substrate is just simply operated for obtaining the temperature control without capability to measure the thermal resistance. As such, those conventional approaches of measuring the thermal resistance are all restricted because the measurement of the TSP requires a stable testing condition which correspondingly requires a relative long time for getting the temperature balanced. Therefore, conventional approaches are not suitable for fast measurement of thermal resistances, optical characteristics of LEDs under different temperatures. Currently, these are the difficult issues in measuring the LED characteristics. As such, a critical concern in the art is to find out a solution and provide an apparatus and a method for measuring a characteristic and a chip temperature of an LED in a faster manner.

SUMMARY OF THE INVENTION

Accordingly, the present invention is directed to an apparatus and a method for measuring a characteristic and a chip temperature of an LED. The present invention applies a temperature control directly to the LED chip by thermal conduction, so as to rapidly achieve a stable temperature variation, and promptly measure a TSP of the LED chip.

The present invention provides an apparatus for measuring a characteristic and a chip temperature of an LED. The apparatus includes a thermal conductive component, an LED chip, a temperature control unit, and a power-source and voltage-meter unit. The LED chip is disposed on the thermal conductive component. The temperature control unit is connected to the thermal conductive component for providing a temperature to the thermal conductive component, and therefore providing the temperature to the LED chip via the thermal conductive component. The power-source and voltage-meter unit provides a current to the LED chip, and measures a voltage value of the LED chip. Under a measurement mode, the current is featured with a current waveform having a high current level and a low current level which are alternatively changed, for applying to the LED chip. Measurements are taken respectively corresponding to the high current level and the low current level, and a correlation curve between the voltage and the temperature can at least be obtained with the results of measurement.

The present invention provides a method for measuring a characteristic and a chip temperature of an LED. The method includes providing a thermal conductive component, and providing an LED chip disposed on the thermal conductive component. A temperature is provided to the LED chip in thermal conductive type via the thermal conductive component. A current is applied to the LED chip. The current is featured with a current waveform having a high current level and a low current level which are alternatively varied. The method further includes measuring a correlation curve between a voltage and a temperature at either the high current level or the low current level.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
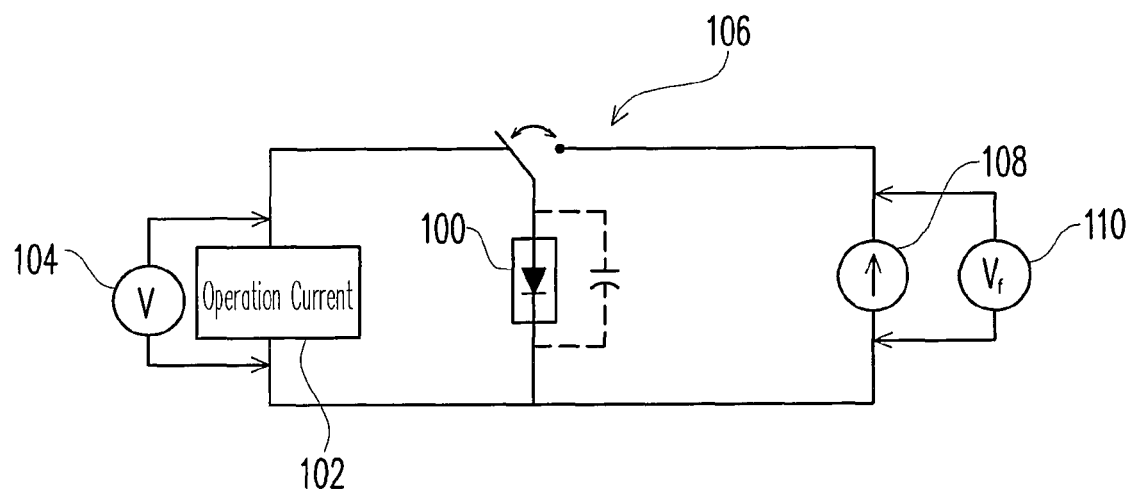
FIG. 1 is a schematic diagram illustrating a testing circuit for measuring a thermal conductivity of a conventional IC chip.

Reference will now be made in detail to the present preferred embodiments of the invention, examples of which are illustrated in the accompanying drawings. Wherever possible, the same reference numbers are used in the drawings and the description to refer to the same or like parts.

The present invention is adapted for obtaining a better result in complete, fast and accurate measurement of optical and thermal characteristics of an LED. The apparatus and method according to the present invention employ a thermal conductive type mechanism to directly heat the LED to a desired temperature, so as to allow a fast measurement of a TSP. The apparatus and the method further combine the measurement of optical characteristics, or even control of the substrate temperature or ambient temperatures. According to an aspect of the embodiment, the present invention may even further include a data acquisition (DAQ) card, so as to acquire more and accurate voltage values during a short switching time.

Embodiments are given below for illustration purpose without restriction of the scope of the present invention. The embodiments may be varied or modified according to the spirit of the present invention by adaptively combine one with the others without limit to a single embodiment.

Figure 2:
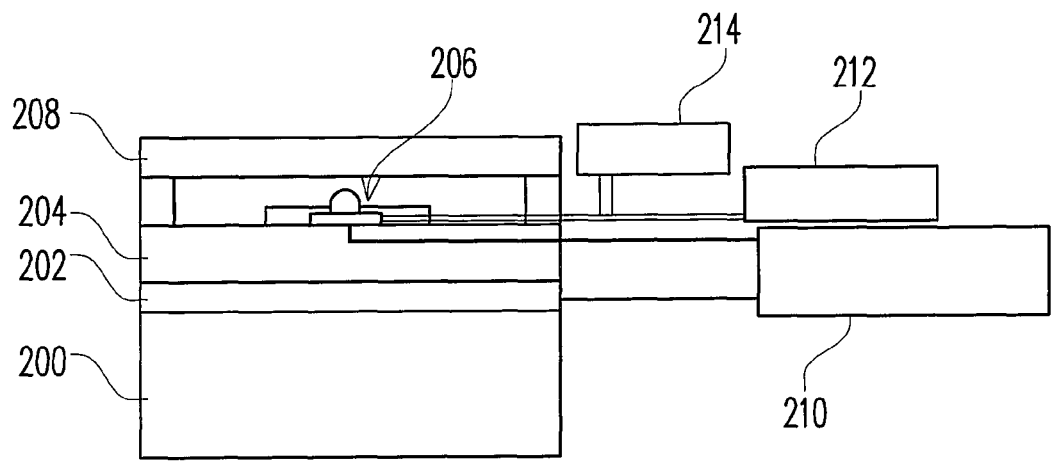
FIG. 2 is a schematic diagram illustrating an apparatus for measuring a characteristic and a chip temperature of an LED, according to an embodiment of the present invention.

FIG. 2 is a schematic diagram illustrating an apparatus for measuring a characteristic and a chip temperature of an LED chip, according to an embodiment of the present invention. Referring to FIG. 2, a temperature control unit is used for providing a temperature control. As shown in FIG. 2, the temperature control unit can include a temperature control component 202, such as a heater, a thermoelectric cooler, or the like. The thermoelectric cooler can be used in measuring a temperature lower than a room temperature. A thermal module 200 is employed for providing stable heat dissipation for a heat source introduced by the temperature control component 202. The temperature control unit may further include a certain control circuit, for example a temperature control module 210, for achieving a temperature control. Further, it should be noted that if the temperature control component 202 is a heater, it does not require an additional heat dissipation module. In other words, the temperature control unit can be any known temperature control mechanism for controlling to achieve a desired temperature.

The present invention further propose to heat or cool the LED chip by a thermal conductive type approach, to achieve the desired temperature. According to an aspect of the embodiment, a thermal conductive component 204 is coupled to the temperature control component 202. Therefore, the thermal conductive component 204 is adapted to achieve a balance of temperature with the temperature control component 202 and obtain the desired temperature in a short time. The thermal conductive component 204 for example can include a structural layer of a metal having a high conductivity coefficient, e.g., Cu. According to an aspect of the embodiment, the apparatus may further include a layer of heat insulation cover 208 overlaying the thermal conductive component 204, to form a heat insulating space. The heat insulation cover 208 can be, for example, composed of a combination of heat insulating materials such as adiabatic asbestos and bakelite.

The LED chip 206 to be measured, according to an aspect of the embodiment, is for example adhered on the thermal conductive component 204 by thermal conductive paste. The LED chip 206 is preferably received within the heat insulating space configured by the heat insulation cover 208 to obtain a relative stable temperature. However, it should be noted that the heat insulation cover 208 is preferred but not an absolutely necessary component for the apparatus according to the present invention.

The apparatus according to the present invention may further include a power-source and voltage-meter unit for providing a current to the LED chip 206, and measuring an output voltage value of the LED chip 206. The power-source and voltage-meter unit for example is a source meter 212 which can provide a current to the LED chip 206, and simultaneously measure the output voltage thereof. If the output voltage is desired to be more accurate or the source meter 212 is replaced with a usual power supply, a DAQ card 214 can be employed for obtaining a more accurate voltage value. Further, the metal structural layer of the thermal conductive component 204 may include a temperature sensing terminal for coupling with the temperature control unit 210. The LED chip 206 is coupled with the source meter 212. It should be noted that in practical use, the apparatus may be modified or varied to include other circuit structures and affixture structure assembled thereto according to the practical need. The probable variations can be made based on well known knowledge in the art, and are not to be further described here. The apparatus as defined hereby is to achieve a temperature control to the LED chip 206 with a thermal conductive type approach for effectively replacing the conventional measuring apparatus which relying on an over to heat the LED chip. In such a way, the apparatus according to the present invention is also adapted for simplifying the equipment for measurement and shortening the operation time.

Figure 3:
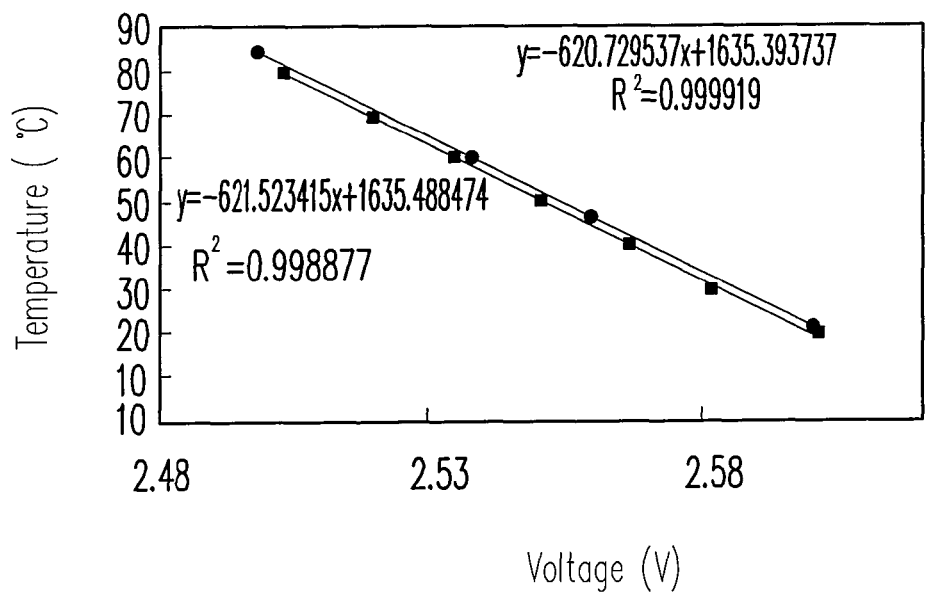
FIG. 3 is a schematic diagram illustrating a verification result of a measurement by a small current provided by a source meter.

FIG. 3 is a schematic diagram illustrating a verification result of a measurement by a small current, i.e., 1 mA, provided by a source meter. Referring to FIG. 3, there are several curves shown for describing correlations between the voltage and the temperature when a small current is applied thereto. As a result, the present invention can control the temperature of LED chip by thermal conductive type approach. As shown in FIG. 3, the curve configured by connection of round dots, such as the straight line, describes a measurement obtained by a conventional approach in which the LED chips is heated with an oven. The curve by connection of square dots describes a measurement achieved in accordance with the present invention, in which a temperature of the LED chips is controlled with a thermal conductive type approach. Comparing the two curves, it can be learnt that the two curves are basically consisting one to another, and therefore it indicates that the accuracy of the measurement according to the present invention is sustained, while the speed of the measurement according to the present invention is 10 times faster than the conventional speed.

Figure 4:
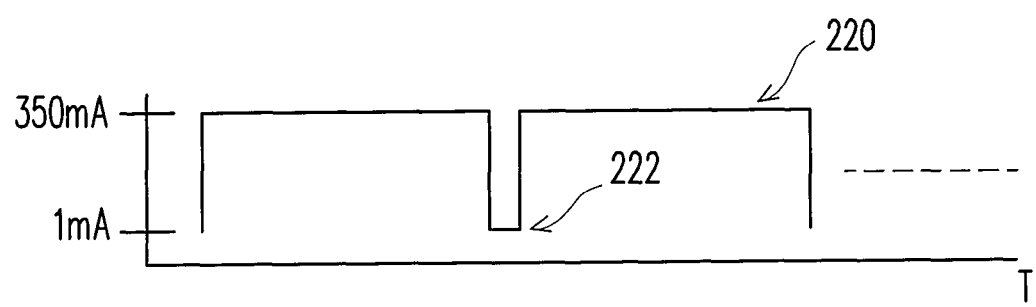
FIG. 4 is a schematic diagram illustrating a waveform of a current applied to the LED according to an embodiment of the present invention.

In measuring a thermal resistance, the present invention employs a source meter for providing a pulse current including a real current Ion and a small current Ioff. A time of inputting the small current Ioff is preferred to be less than 0.01% of a time of inputting the real current Ion. However, real values thereof may be varied according to practical need. FIG. 4 is a schematic diagram illustrating a waveform of a current applied to the LED according to an embodiment of the present invention. Referring to FIG. 4, an optical characteristic of the LED chip 206 can be measured at a current level 220 of the real current Ion, and a chip temperature of the LED chip 206 can be obtained in accordance with the correlation curves shown in FIG. 3 for example by measuring a forward voltage difference with the source meter at a current level 222 of the small current Ioff. Further, optionally, an additional DAQ card 214 may be employed for acquiring more and better accurate voltage data. Other variety of options may also be applied as needed.

In a practical measurement process, stable forward voltages can be measured corresponding to different stable temperatures. The stable temperatures for example can be selected as 20° C., 40° C., 60° C., and 80° C. Further, after obtaining the correlation curve of the voltage and the temperature, the operation current can be maintained to apply on the LED chip 206. The chip temperature of the LED chip 206 can be obtained by measuring a voltage value of the LED chip under the operation current, and then converting the voltage value according to the correlation curve.

The method for measuring the thermal resistance is taught above. Thereby, the chip temperature of the LED chip 206 can be rapidly obtained. Then, during a time period of applying the high current level, the optical characteristics can be measured without a switch required by the conventional measurement mechanism. The optical characteristics for example include measuring a light emitting efficiency of the LED chip 206. In such an application, an optical integrating sphere may be employed for more accurately measuring a light emitting intensity and preventing a leakage of light.

Figure 5:
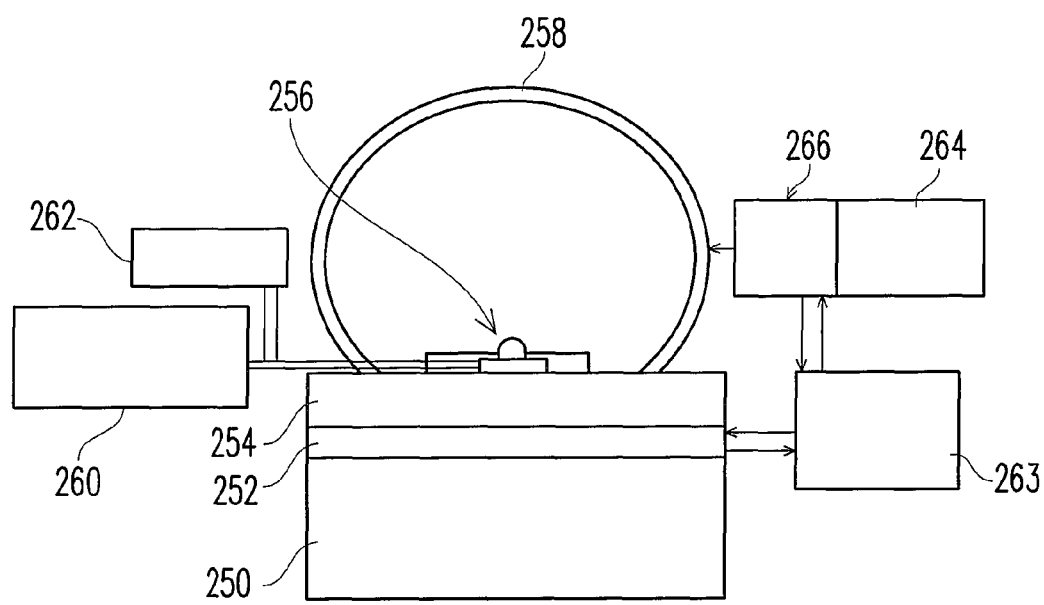
FIG. 5 illustrates an apparatus having an optical integrating sphere for measuring a characteristic and a chip temperature of an LED, according to another embodiment of the present invention.

FIG. 5 illustrates an apparatus having an optical integrating sphere for measuring a characteristic and a chip temperature of an LED, according to another embodiment of the present invention. Referring to FIG. 5, there is shown a structure substantially similar to that shown in FIG. 2, except that the heat insulation cover 208 is replaced by an integrating sphere 258 assembled to the thermal conductive component 254. A chip fixing structure is configured to fix the LED chip 256, and for preventing a light leakage from the integrating sphere 258. The apparatus further includes a temperature control unit disposed under the thermal conductive component 254. The temperature control unit for example includes a temperature control component 252 and a thermal module 250. The thermal conductive unit 204 is adapted to achieve a same temperature of the temperature control component 252 in a short time. Associating with the temperature control component 252, the thermal module 250 is adapted to control the temperature variation. Further, a source meter 260 provides a current to the LED chip 256, and reads a voltage value of the LED at the same time. According to an aspect of the embodiment, the apparatus may further include a DAQ card 262 for more accurately read the voltage value. According to a further aspect of the embodiment, besides controlling the temperature of the temperature control component 252, the temperature control module 263 may also control the temperature of another thermal control component 266 to control the temperature of the integrating sphere 258. The temperature control component 266 is cooperatively operated the thermal module 264.

According to an embodiment of the present invention, the LED chip can be fast installed and provided with power supply. According to the embodiment, the integrating sphere is designed to be a sphere which can be heated. In such a way, a substrate operation temperature and an ambient temperature can be controlled, so as to obtain a correlation between the optical characteristics and the ambient temperature (or the substrate operation temperature).

Figure 6:
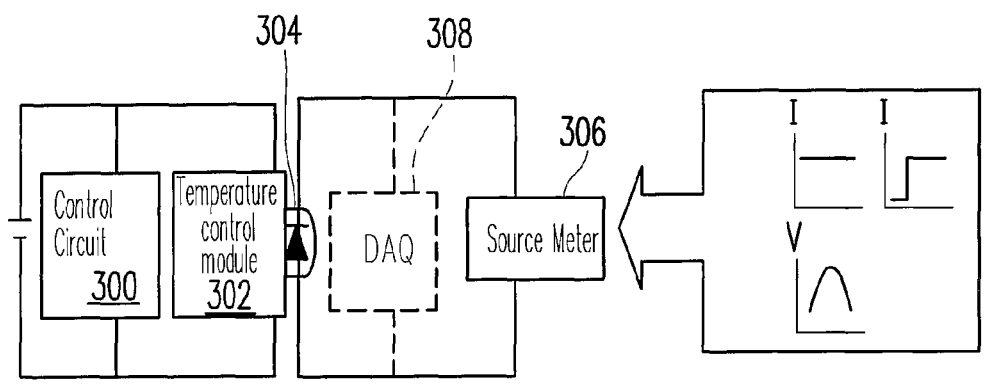
FIG. 6 is a circuit diagram illustrating an apparatus for measuring a characteristic and a chip temperature of an LED, according to an embodiment of the present invention.

FIG. 6 is a circuit diagram illustrating an apparatus for measuring a characteristic and a chip temperature of an LED, according to an embodiment of the present invention. Referring to FIG. 6, there is shown a temperature control unit including a control circuit 300 and a temperature control module 302. The temperature control unit is adapted for providing a desired temperature. An LED chip 304 to be measured is disposed in contact with the temperature control unit so as to obtain the desired temperature therefrom in a thermal conductive type manner. A source meter 306 applies a current to the LED chip 304, and at the same time measures a voltage value of the LED chip 304, and thus obtaining a curve of correlation between the temperature and the voltage. According to an aspect of the embodiment, a DAQ card 308 can be included for reading more accurately the voltage values of the LED chip 304. When the source meter 306 is in normal operation, it applies a high level current value I, and at the same time measures a voltage value V. If the source meter 306 is to measure a TSP, it applies current with levels alternatively varying.

Figure 7:
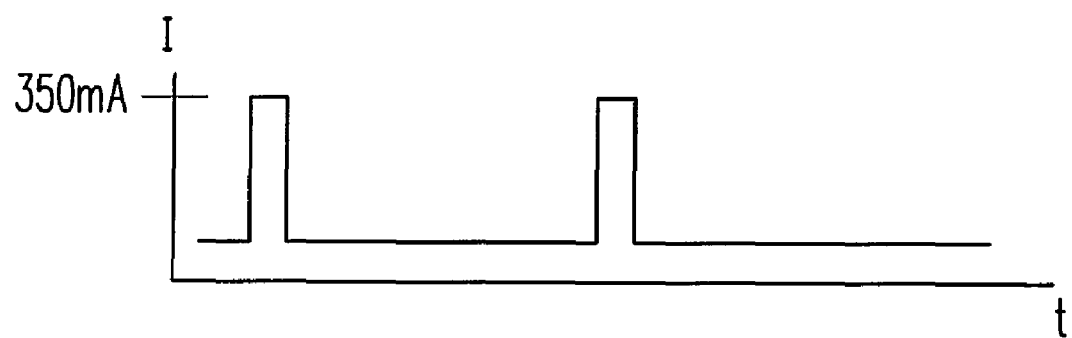
FIG. 7 illustrates a current waveform representing a correlation between the chip temperature of the LED and the voltage thereof according to an embodiment of the present invention.
Figure 8:
FIG. 8 illustrates a voltage pulse waveform generated after applying the current to the LED chip, according to another embodiment of the present invention.
Figure 9:
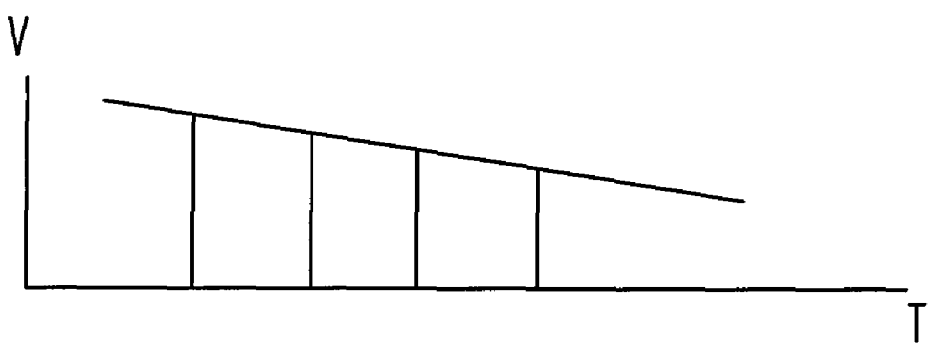
FIG. 9 is a schematic diagram illustrating the correlation between the voltage and the temperature obtained by the mechanism of FIG. 7.

Then, when a temperature-voltage correlation curve of the LED is to be measured, it is not necessary to only adopt the waveforms shown in FIG. 4. FIG. 7 illustrates a current waveform representing a correlation between the chip temperature of the LED and the voltage thereof according to another embodiment of the present invention. Referring to FIG. 7, the current waveform is applied to the LED chip in a manner of pulses which is defined with a high current level and a low current level. The high current level for example is 350 mA, and the low current level for example is 1 mA or 0 A. The pulse preferably has a width for example about 2 ms to 4 ms, or even less than 1 ms. With such a current waveform, the temperature and the voltage of the LED chip are measured at the high current level. As such, the temperature-voltage correlation can be accurately measured. However, in order to obtain a more accurate voltage value, a fore edge voltage average may be adopted. FIG. 8 illustrates a voltage pulse waveform generated after applying the current to the LED chip, according to another embodiment of the present invention. Referring to FIG. 8, after the current pulse as shown in FIG. 7 is applied to the LED chip, a voltage which gradually attenuates is outputted therefrom. Therefore, it is preferred to measure a voltage value of the fore edge of the voltage after inputting the current pulse. For example, a voltage average of 10 earlier sampling points is taken as a measuring voltage value, which is helpful to reduce an interference caused by the temperature factors. FIG. 9 is a schematic diagram illustrating the correlation between the voltage and the temperature obtained by the mechanism of FIG. 7. Referring to FIG. 9, it is preferred to measure output voltages of the LED chip in correspondence with different temperatures to obtain the voltage-temperature correlation curves. In this embodiment, the exemplified voltage-temperature correlation is a linear correlation represented by a straight line which can be obtained by a statistical analysis method. However, the voltage-temperature correlation may be obtained as a curved line, according to the actual data variation.

After obtaining the voltage-temperature correlation curve, the LED chip can be then maintained to operate with the operation current. The chip temperature of the LED chip can be obtained by converting the measured voltage value of the LED chip when operating with the operation current. As to the embodiment which includes the integrating sphere, the optical characteristics and a forward voltage difference can be measured and acquired together by directly providing the operation current, in which Ion=Ioff.

For another aspect, the apparatus and the method for fast measuring optical characteristics and a chip temperature of an LED can be described in a two-stage manner. In the first stage, the apparatus includes a temperature control module and a heat insulation container, for measuring a forward bias voltage, a temperature calibration curve, and a TSP of the LED. In the second stage, the apparatus includes a the temperature control module, a pulse power supply and a data acquisition module, in which a pulse current is inputted for measuring an optical characteristic, such as the variation of luminous flux, color temperature, light emitting efficiency, and wavelength corresponding to the change of temperature, and measuring a voltage difference when inputting with a small current, and thus converting to obtain the chip temperature and the thermal resistance.

The aforementioned heater or the temperature control device for example can be a temperature control component, such as a wire heater, a plate heater, or a thermoelectric cooler. It should be noted that if only a heater is included, it does not require a heat dissipation module. On the contrary, if a thermoelectric cooler is used therein, it requires a heat dissipation module, which can be either air-cooled or water-cooled. With the heat dissipation module, the apparatus allows a temperature lower than the room temperature.

The temperature control module, for example, can be any possible known control mechanism including proportional-integral-derivative controller (PID controller), fuzzy controller, or on/off controller. According to an aspect of the embodiment, the temperature control module further includes an amplifier.

Further, the aforementioned high thermal conductive metal, is preferably copper or bronze, while can also be aluminum. The LED can be pasted to the high thermal conductive metal with the thermal conductive grease. A slot is configured over the LED for embedding a temperature sensor therein.

As for the heat insulation cover, it can be configured with a combination of heat insulating materials such as adiabatic asbestos and bakelite. The cooperation of the heat insulation cover and the high thermal conductive metal restricts most heat generated thereby to be dissipated downwardly. The LED further includes a chip fixing structure configured to fix the LED chip, and for preventing a light leakage from the integrating sphere. The embodiments of the present invention are adapted to fast install the LED and provide a power source.

Moreover, the present invention may further include a sensor, for detecting a temperature of the substrate. The sensor can be combined with the temperature control device and module for controlling the temperature of the substrate. According to a preferred embodiment, the temperature of the substrate is controlled within a range about 5° C.-85° C., for observing a variation of the optical characteristic of the LED corresponding to a change of the temperature of the substrate. Further, it is preferred to use a RS232 transmission line or USB transmission line for signals communication with the host computer for controlling temperature.

The integrating sphere, for example scatters the light emitted from the LED chip, and then integrates the scattered light in sum to obtain an optical characteristic of the LED chip. In such a way, the present invention is capable of simultaneously measuring the optical characteristics of the LED chip and the thermal characteristics. For example, when a real current is inputted, the optical characteristics are measured, and when a small current is inputted, the chip temperature and the thermal resistance of the LED are measured. According to a further aspect of the embodiment, the integrating sphere is a constant temperature device, so that the integrating sphere can be further used for controlling an ambient temperature variation, so as to observe a variation of the optical characteristics corresponding to a change of the ambient temperature.

In summary, the present invention provides a fast temperature change to an LED chip with a thermal conductive type approach. The practical circuit and structure of the present invention may be varied by those skilled in the art in accordance with the spirit of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for measuring a characteristic and a chip temperature of an LED, comprising:
   a thermal conductive component,
   an LED chip, disposed on the thermal conductive component;
   a temperature control unit, connected to the thermal conductive component for providing a temperature to the thermal conductive component, and providing the temperature to the LED chip via the thermal conductive component; and a power-source and voltage-meter unit, providing a current to the LED chip, and measuring a voltage value of the LED chip, wherein under a measurement mode, the current is featured with a current waveform having a high current level and a low current level, the high current level and the low current level being alternatively changed, for applying to the LED chip, wherein measurements are conducted respectively corresponding to the high current level or the low current level, for at least obtaining a voltage-temperature correlation curve.

2. The apparatus according to claim 1, wherein the optical characteristic is measured at the high current level, and an output voltage corresponding to the temperature is measured at the low current level.

3. The apparatus according to claim 1, wherein the high current level is an operation current of the LED chip.

4. The apparatus according to claim 1, wherein the high current level is a pulse current, and an output voltage of the LED chip is an average of a plurality of measurements at a fore edge of the pulse.

5. The apparatus according to claim 1, further comprising a heat insulation cover for forming a heat insulation space over the thermal conductive component, the heat insulation space encapsulating the LED chip therein.

6. The apparatus according to claim 1, further comprising an optical integrating sphere disposed on the thermal conductive component, and encapsulating the LED chip.

7. The apparatus according to claim 6, wherein the optical integrating sphere has an operation temperature controlled by the temperature control component.

8. The apparatus according to claim 1, wherein temperature control unit comprises a heater for providing a temperature which is higher than a room temperature.

9. The apparatus according to claim 1, wherein the temperature control component comprises a thermoelectric cooler, for providing a temperature higher or lower than a room temperature.

10. The apparatus according to claim 1, wherein the thermal conductive component comprise a metal structural layer, wherein the LED chip is adhered on the thermal conductive component by a thermal conductive paste, and the metal structural layer comprises a temperature sensing terminal for coupling with the temperature control unit.

11. The apparatus according to claim 1, wherein the power-source and voltage-meter unit comprises a source meter, providing a current source and simultaneously measuring a load voltage.

12. The apparatus according to claim 1, wherein the power-source and voltage-meter unit comprises a current source unit and a voltage acquisition unit.

13. A method for measuring a characteristic and a chip temperature of an LED, comprising:

providing a thermal conductive component, providing an LED chip disposed on the thermal conductive component;

providing a temperature to the LED chip via the thermal conductive component in a thermal conductive type manner;

providing a current to the LED chip, the current being featured with a current waveform having a high current level and a low current level which are alternatively changing; and obtaining a voltage-temperature correlation curve, at either the high current level or the low current level.

14. The method according to claim 13, wherein the step of measuring the voltage-temperature correlation curve comprises measuring an output voltage of the LED chip when at the low current level.

15. The method according to claim 13, wherein an operation ratio of a width of the low current level is substantially smaller than 0.01%.

16. The method according to claim 13, wherein the optical characteristic is measured during the operation at the high current level.

17. The method according to claim 13, wherein the step of measuring the voltage-temperature correlation curve comprises repetitively measuring an average of an output voltage of the LED chip at a fore edge during the operation at the high current level.

18. The method according to claim 13, wherein the high current level is a pulse current.

19. The method according to claim 13, wherein the correlation curve is obtained by measuring stable forward voltages of respectively a plurality of measuring points at different stable temperatures.

20. The method according to claim 13, wherein after obtaining a voltage-temperature correlation curve, the method further comprises:

maintaining the high current level for applying to the LED chip;

measuring an output voltage of the LED chip; and converting the outputted voltage and obtaining a measurement temperature according to the correlation curve, wherein the measurement temperature is corresponding to the high current level.

21. The method according to claim 13, further comprising:
providing a heat insulation cover, for providing the LED chip a heat insulation.

22. The method according to claim 13, further comprising:
providing an optical integrating sphere, for scattering light emitted by the LED chip, and integrating the scattered light in sum, and obtaining the optical characteristic of the LED chip.

* * * * *